United States Patent [19]

Ando et al.

[11] Patent Number: 5,219,919

[45] Date of Patent: Jun. 15, 1993

[54] RESIN FOR POWDER MOLDING AND PROCESS FOR PRODUCING THE SAME

[75] Inventors: Masaru Ando, Ichihara; Katsuoki Uemura, Chiba, both of Japan

[73] Assignee: Chisso Corporation, Tokyo, Japan

[21] Appl. No.: 827,481

[22] Filed: Jan. 29, 1992

Related U.S. Application Data

[63] Continuation of Ser. No. 254,887, Oct. 7, 1988, abandoned.

[30] Foreign Application Priority Data

Oct. 13, 1987 [JP] Japan ................... 62-258074
Jun. 21, 1988 [JP] Japan ................... 63-152738

[51] Int. Cl.$^5$ .................. C08L 27/00; B32B 5/16; B32B 27/30
[52] U.S. Cl. .................. 524/569; 428/407; 524/567
[58] Field of Search .................. 428/407; 524/569

[56] References Cited

U.S. PATENT DOCUMENTS

| | | | |
|---|---|---|---|
| 2,931,782 | 4/1960 | Jarret | 428/407 |
| 3,928,500 | 12/1975 | Kraft et al. | 525/257 |
| 3,992,558 | 11/1976 | Smith-Johannsen et al. | 428/407 |
| 4,040,997 | 8/1977 | Van Vonno et al. | 428/407 |
| 4,097,558 | 6/1978 | Kuhn | 525/239 |
| 4,440,908 | 4/1984 | McClain | 525/196 |
| 4,764,424 | 8/1988 | Ganga et al. | 428/327 |
| 4,789,597 | 12/1988 | Gupta et al. | 428/407 |
| 4,870,118 | 9/1989 | Kinoshita et al. | 523/207 |
| 4,956,222 | 9/1990 | Matsuura et al. | 428/212 |

FOREIGN PATENT DOCUMENTS

| | | |
|---|---|---|
| 131651 | 1/1982 | Japan . |
| 66440 | 4/1984 | Japan . |
| 155434 | 9/1984 | Japan . |
| 161456 | 9/1984 | Japan . |

*Primary Examiner*—Goerge F. Lesmes
*Assistant Examiner*—Christopher Brown
*Attorney, Agent, or Firm*—Fay, Sharpe, Beall, Fagan, Minnich & McKee

[57] ABSTRACT

A resin for powder molding having a superior flowability; capable of faithfully duplicating the patterns of a mold even when the mold has a complicated structure and fine projection and depression parts; capable of obtaining a molded product having a uniform thickness and no pinholes; and having a good storage stability over a long term, and a process for producing the resin are provided, which resin is obtained by coating a powdery vinyl chloride resin composition containing plasticizer with a high polymer film component on the surface of the composition.

7 Claims, No Drawings

RESIN FOR POWDER MOLDING AND PROCESS FOR PRODUCING THE SAME

This is a continuation of co-pending application Ser. No. 254,887 filed on Oct. 7, 1988, now abandoned.

BACKGROUND OF THE INVENTION

Field of the Invention

This invention relates to a resin for powder molding and a process for producing the same. More particularly it relates to a resin for powder molding obtained by coating the surface of a powdery vinyl chloride resin composition (hereinafter abbreviated to "vinyl chloride composition") with a high-molecular film component and a process for producing the same. Since this resin for powder molding has a superior powder flowability, it is possible to faithfully duplicate patterns of a mold even in the case of the mold having a complicated shape and fine projection and depression parts and to produce a molded product having no pinholes and a uniform thickness.

Description of the Related Art

Recently, processes for processing resins for powder molding include various molding processes and coating processes, and representative examples thereof are rotational molding process, slush molding process, fluidization dip coating process, electrostatic coating process, etc. Among these, slush molding process wherein powder feed and baking are carried out inside a mold and the resulting molded product is taken out is a superior molding process. The reason that this slush molding process is noted is that leather grain patterns are faithfully duplicated; the resulting product has a superior appearance; a molded product having a complicated shape of deep draw is obtained; there is a degree of freedom for a novel design; the product has a soft feeling; and hence a high-quality feeling unlike plastics is exhibited, so that the product matches recent interior markets pointing to high-quality products. Further, the slush molding process is also superior in the aspects of handling, thickness uniformity and making the product thin-gauge and moreover, capability of effecting color blend molding and reuse. The slush-molded products have been used as interior materials for automobiles such as door trim, crush pad, console box, etc.

The resins for powder molding used for the powder molding process include vinyl chloride compositions. However, in the case of the compositions as they are, since liquid additives such as plasticizer, etc. bleed, powder flowability is far inferior to make powder molding difficult.

Among processes for improving such powder flowability, there is a process wherein a small quantity of fine powder of vinyl chloride resins is post-added onto the surface of vinyl chloride compositions to remove the adhesive properties of the compositions and thereby improve the powder flowability (Japanese patent application laid-open Nos. Sho 56-131651/1981, Sho 59-66440/1984, Sho 59-155434/1984 and Sho 59-161456/1984.) Besides, there is a process of enlarging the particle diameter of vinyl chloride compositions to thereby improve the powder flowability and a process of making vinyl chloride resins used for the compositions porous and having a liquid additive such as plasticizer contained in the resulting pores.

Resins for powder molding should have a superior powder flowability and at the same time, a superior melt characteristic, but the powder flowability and the melt characteristic are often contrary to each other. The melt characteristic is often determined depending on the polymerization degree and the quantity of plasticizers. If the quantity of plasticizers is reduced, melt-processing of vinyl chloride resin compositions is difficult and a product accompanied with decomposition is liable to be produced. If the processing temperature is lowered in order to prevent such a decomposition, the resulting product is inferior in the physical properties. To the contrary if the quantity of plasticizers is increased, plasticizers notably bleed onto the surface of powder compositions to deteriorate the powder flowability. For the above-mentioned reason, the quantity of plasticizers used has so far been limited.

A cause of deteriorating the powder flowability consists in bleeding of plasticizers, and as a process for preventing this bleeding, there is a process of coating the powder surface of the resin compositions with a small quantity of fine powder. As such fine powder, a high molecular weight vinyl chloride emulsion polymer is often used, but it is impossible to completely prevent the bleeding of plasticizers. Further, if the resins for powder molding are stored in a warehouse for a long time or at an elevated temperature, there is raised a drawback that plasticizers bleed from the resins to deteriorate the flowability of the resins for powder molding so that it is impossible to stock the resins. Further, if fine powder separated from the resins for powder molding is present in a large quantity, the fine powder is liable to be charged, such charge hinders the flowability of the resins for powder molding.

SUMMARY OF THE INVENTION

The object of the present invention is to provide a resin for powder molding having a superior flowability; capable of faithfully duplicating the patterns of a mold even when the mold has a complicated structure or fine projection and depression parts; capable of obtaining a molded product having a uniform thickness and no pinhole; and having a good stability even in the case of a long term storage, and a process for producing the resin for powder molding.

The present invention has the following specific features:

(1) a resin for powder molding having a powdery vinyl chloride resin composition coated with a high polymer film component on the surface of the powdery composition;

(2) a resin for powder molding according to the item (1) wherein, 100 parts by weight of the powdery vinyl chloride resin composition are coated with 0.1 to 30 parts by weight of the high polymer film component;

(3) a resin for powder molding according to the item (1) or the item (2) wherein the high polymer film component is of a single layer or two layers and composed of a cellulosic compound, a vinyl chloride-vinyl acetate copolymer or an acrylic resin;

(4) a resin for powder molding according to the item (1), wherein the powdery vinyl chloride resin composition is coated with the high polymer film component and fine powder on the surface of the powdery composition;

(5) a resin for powder molding according to the item (4), wherein the fine powder is of a vinyl chloride resin having an average particle diameter of 0.001 to 20 μm;

(6) a process for producing a resin for powder molding, which comprises coating a powdery vinyl chloride resin composition with a liquid for film comprising a high polymer film component and a medium on the surface of the composition, followed by removing the medium;

(7) a process for producing a resin for powder molding according to the item (6), wherein the liquid for film is a solution or dispersion of the high-molecular film component;

(8) a process for producing a resin for powder molding according to the item (6) or the item (7), wherein agitation of the powdery vinyl chloride resin composition, spraying of the liquid for film and formation of film are carried out in the same agitating vessel; and (9) a process for producing a resin for powder molding according to the item (8), wherein a resin for powder molding according to the item 3 or 5 is used.

DETAILED DESCRIPTION OF PREFERRED EMBODIMENTS

The liquid for film used in the production process refers to a solution of a high polymer film component dissolved in a medium for the solution or a dispersion of a high polymer film component dispersed in a medium for the dispersion. The reason that it is dared herein that the dispersion is included in the liquid for film is that even in the case of the so-called "water-paint", a film is also formed, and it is impossible to distinguish dispersing from dissolution.

The vinyl chloride composition (vinyl chloride resin composition) of the present invention refers to a powdery composition having additives such as plasticizer, stabilizer, etc. added to vinyl chloride resins.

The vinyl chloride resin refers to vinyl chloride homopolymer or copolymers of vinyl chloride with monomers copolymerizable therewith, and in order to enlarge its particle diameter and also to make it porous to thereby improve the absorptivity of plasticizers, those produced according to suspension polymerization process or bulk polymerization process are preferred. Further, examples of the monomers copolymerizable with vinyl chloride monomer are ethylene, propylene, butene, pentene-1, butadiene, vinyl esters or aryl esters of carboxylic acids such as acetic acid, caproic acid, caprylic acid, benzoic acid, etc., dialkyl maleates or fumarates the alkyl group of which has 1 to 12 carbon atoms, acrylonitrile, vinylidene chloride, vinylidene cyanide, alkyl vinyl ethers, the alkyl group of which has 1 to 16 carbon atoms, N-vinyl pyrrolidone, vinylpyridine, vinylsilane, alkyl acrylates or alkyl methacrylates the alkyl group of which has 1 to 16 carbon atoms, etc. At least one kind of these compounds may be copolymerized in a proportion of 40 parts by weight or less, preferably 30 parts by weight based on 100 parts by weight of vinyl chloride.

Examples of plasticizers absorbed in the vinyl chloride resin are dialkyl phthalates, dialkyl adipates, trialkyltrimellitates, dialkyl sebacates, dialkyl azelates, alkyl benzyl phthalates, trialkyl phosphates, alkyl aryl phosphates, the alkyl groups of these esters having 4 to 13 carbon atoms and polyester plasticizers. Concrete examples are di-n-butyl phthalate, di-n-octyl phthalate, di-2-ethylhexyl phthalate (DOP), diisooctyl phthalate, octyl decyl phthalate, diisodecyl phthalate, butyl benzyl phthalate, di-2-ethylhexyl isophthalate, di-2-ethylhexyl adipate (DOA), di-n-decyl adipate, diisodecyl adipate, tri-2-ethylhexyl trimellitate, 2-ethylhexyl azelate, dibutyl sebacate, di-2-ethylhexyl sebacate, tributyl phosphate, tri-2-ethylhexyl phosphate, 2-ethylhexyl diphenyl phosphate, tricresyl phosphate, triheptyl trimellitate, trinonyl trimellitate, triundecyl trimellitate, etc., and any of those can be used without any particular limitation as far as they are used for vinyl chloride resins. Further, two or more kinds of these plasticizers can be used in admixture.

Further, other additives such as stabilizers, coloring agents, lubricants, fillers, secondary Plasticizers, etc. can be added to the vinyl chloride compositions within a range in which they have no bad influence upon the compositions.

The film component of the present invention forms a coating on the particle surface of the vinyl chloride composition and hence should have few adhesion to one another; thus it is restricted to high polymer materials.

Examples of the high polymer materials of the film component are cellulosic compounds such as viscose, methyl cellulose, hydroxyethyl cellulose, cellulose acetate, cellulose acetate phthalate, etc., starches such as soluble starch, carboxymethylated starch, corn starch, etc., proteins such as hide glue, gelatin, casein, etc., mucilages by means of microorganisms such as dextran, levan, etc., plant mucilages such as tragacanth gum, acacia gum, etc., marine algae such as galactan, sodium alginate, etc., vinyl polymers such as polyvinyl alcohol, polyvinylidene chloride, polyvinyl acetate, polyvinyl ether, etc., thermoplastic resins, such as polyethylene oxide, polyethylene, acrylic resins, silicones, polyesters, polyamides, etc., natural or synthetic rubbers such as SBR, butyl rubber, polychloroprene, NBR, polysulfide, reclaimed rubber, etc. Among these, those which have been very often used as adhesives and have no sticky properties are preferred, and further, cellulosic compounds, vinyl chloride-vinyl acetate copolymer, acrylic resins are particularly preferred. Further, the film component, too, can contain additives such as stabilizer, coloring agent, lubricant, filler, plasticizer, etc. within a range in which these have no bad effect upon the powder molding.

The high polymer film component of the present invention may be of a quantity in which more than half of the surface of the vinyl chloride composition is coated. The quantity is not a quantity in which it has been confirmed whether the powdery vinyl chloride composition has been coated uniformly and completely without any uncoated surface. However, the quantity of the high polymer film component based on 100 parts by weight of the vinyl chloride composition is preferably in the range of 0.1 to 30 parts by weight as calculated in terms of solids, most preferably in the range of 0.5 to 10 parts by weight, and it is possible to exhibit a sufficient function in such quantity.

Fine powder which can be used in the present invention may be inorganic materials having a small particle diameter or organic materials containing a high polymer substance. Further, this fine powder is preferred to be a powdery vinyl chloride composition having an average particle diameter of 0.001 to 20 μm, since it is possible to obtain a resin for powder molding having a superior flowability. If a fine powder larger than 20 μm is used, its adhesion onto the surface of the resin for powder molding having a film formed thereon is inferior and hence peeling-off of powder occurs. As to the powdery vinyl chloride resin having fine powder thereon, if the resin powder is in the form of a sphere having no pore therein and a smooth surface, the sticking of the film component to the resin surface used together may be reduced. Thus, a vinyl chloride resin for paste processing having a polymerization degree of 700 to 2,000 according to emulsion polymerization process is very often used. This vinyl chloride resin for paste processing, too, is vinyl chloride homopolymer or a copolymer of vinyl chloride with a monomer copolymerizable therewith. Further, examples of the monomer copolymerizable with vinyl chloride are ethylene, propylene, butene, pentene-1, butadiene, styrene, α-methylstyrene, vinyl esters or aryl esters of acetic acid, caproic acid, caprylic acid, benzoic acid, etc., dialkyl maleates or fumarates the alkyl group of which has 1 to 12 carbon atoms, acrylonitrile, vinylidene chloride, vinylidene cyanide, alkyl vinyl ethers the alkyl group of which has 1 to 16 carbon atoms, N-vinylpyrrolidone, vinylpyridine, vinylsilanes, alkyl acrylates or methacrylates the alkyl group of which has 1 to 16 carbon atoms, etc. At least one of these may be copolymerized with vinyl chloride in the range of 40 parts by weight or less, preferably 30 parts by weight or less based on 100 parts by weight of vinyl chloride.

If the high polymer in the dispersion of the present invention has an average particle diameter of 20 μm or less, the appearance of the resulting product is not deteriorated; hence such diameter is preferred.

The medium for the liquid for film used in the process of the present invention is used in the form of solution or dispersion, but the forms cannot be strictly distinguished from each other. Examples of the medium are ketones such as acetone, methyl ethyl ketone, etc., alcohols such as methyl alcohol, ethyl alcohol, etc., ethers such as methyl ether, ethyl ether, etc., hydrocarbons such as pentane, hexane, mineral spirits, toluene, xylene, etc., esters such as methyl acetate, ethyl acetate, etc., cellosolves, water, etc. At least two kinds of these may be used in admixture. As the medium used in the form of solution or dispersion, those very often used in adhesives are preferred.

As the process for forming the coating employed in the production process of the present invention, blowing process, dropwise addition process, dipping process, etc. may be employed. When the liquid for film is adhered onto the powder of vinyl chloride resin composition while the composition is stirred in a stirring vessel, a uniform coating is obtained. After the liquid for film is adhered onto the powdery vinyl chloride composition, the medium of the liquid for film in the solution or dispersion is dried to form the film.

Examples of film-coating means are a centrifugal fluidized type coating granulation device provided with a spraying means and a coating device provided with a spraying means in a simple stirring vessel. Examples of the device provided with a spraying means are Spiral Flow (trademark), spray dryer and High Speed Mixer (trademark). Further, generally used coating devices provided with a spraying means in a simple stirring vessel such as Henschel mixer (trademark), ribbon blender, etc. may also be sufficient.

Beside the spray-blowing process, the addition process of dropwise adding the liquid for film and the dipping process of sufficiently dipping the composition in the liquid for film may also be employed.

The coating velocity at the time of spray coating carried out in the production process of the present invention is preferred to be in the range of 1 to 500 ml/min, particularly 10 to 50 ml/min based on 1 Kg of the vinyl chloride composition, but the velocity is not always limited to such range.

The number of the spraying means used in the production process of the present invention has no particular limitation, and the site at which the means is located also has no particular limitation. However, in order to efficiently form a uniform coating on the particle surface of the vinyl chloride composition, it is preferred to spray the liquid from the upper part corresponding to just the center between the central part and the lateral surface of the coating device toward just below the above upper part or somewhat toward the side of the lateral surface, so as to make the contact area of the spray with the vinyl chloride composition as large as possible. In addition, as to the process for spraying the high polymer film component, one kind thereof may be sprayed to coat the powdery vinyl chloride composition with a single film or two kinds or more thereof may be simultaneously or alternately sprayed to form a multiple film on the powdery vinyl chloride composition.

As to the process for coating the composition with fine powder which may be employed in the present invention, the composition may be coated first with a high polymer film component and thereafter with a fine powder, or it may be coated first with a fine powder and thereafter with a high polymer film component, or formation of a high polymer film component and coating with fine powder may be simultaneously carried out.

As to the resin for powder forming of the present invention, since the surface of the powdery vinyl chloride composition containing a plasticizer is coated with a high polymer film component, a resin having a superior powder flowability is obtained.

The resin for powder molding of the present invention has a superior powder flowability; hence even when a mold having a complicated shape and fine projection and depression parts is employed, the resin fills into details and patterns of the mold are faithly duplicated to make it possible to obtain a molded product having no pinhole and a uniform thickness.

Since the resin for powder molding of the present invention is coated with a high polymer film component, it is possible to completely stop bleeding of a plasticizer from the inside of the composition particles; hence no quality deterioration occurs even during a long term storage and also no blocking occurs even when the composition is under load.

The resin for powder molding coated with the film component of the present invention and further with fine powder is coated with a high polymer film component and further has fine powder adhered thereonto; hence it is possible to reduce the sticky properties of the film component so that the powder flowability is more improved.

The resin for powder molding of the present invention is coated with a high polymer film component; hence even when the vinyl chloride composition constituting the core of the resin is reduced in the particle size, the powder flowability is not reduced even when a mold having a complicated and fine shape is employed, it is possible to sufficiently duplicate the patterns of the mold.

As to the resin for powder molding of the present invention, by optionally choosing the kind of the high polymer film component, it is possible to enhance the function of the resin such as antistatic properties, electrical conductivity, mold release characteristics, etc.

Since the resin for powder molding of the present invention is coated with a high polymer film component, no bleeding occurs and the powder flowability is not deteriorated even when the quantity of plasticizers used is increased.

Further, even in the case of the fluidized dip coating wherein a fluidized bed is formed by air blowing, the powder flowability is much improved, and even in the case of the electrostatic coating process, the resin has a superior flowability; thus the resin is applicable to various powder molding processes and coating processes.

As to the production process of the resin for powder molding of the present invention wherein the surface of the powdery vinyl chloride resin composition is coated with a liquid for film comprising a film component and a medium, followed by removing the medium to form a film, since desired functional characteristics can be afforded to the resin according to such an easy process, the use applications of the process is broad and its commercial utilization value is very great.

The present invention will be described in more detail by way of Examples and Comparative examples.

In addition, in order to evaluate whether the resin for powdery molding is suitable to slush molding process, the coating uniformity and mold release characteristics of the resin according to a molding process similar to the slush molding process were examined and the evaluation methods were carried out as follow:

(1) Measurement of angle of repose:

A resin for powder molding was dropped through a funnel for bulk density measurement provided with a damper (according to JIS-K-6721), followed by filling the resin in an open cylindrical tube of 55 mm in diameter and 50 mm high, positioned just below the funnel, and thereafter rapidly and vertically holding up the cylindrical tube. As a result, the resin for powder molding resin collapses to form a mountain. The angle of repose of the mountain was measured.

(2) Measurement of dropping velocity:

A resin for powder molding (120 ml) was fed into a funnel for bulk density measurement provided with a damper (according to JIS-K-6721), followed by measuring the time in which the total quantity of the resin has dropped and calculating the velocity from the time in terms of 100 ml.

(3) Measurement of bulk density:

Measured according to JIS-K-6721.

(4) Coating uniformity of molded product:

An iron plate (50 × 100 × 3.2 mm) having the surface subjected to plating treatment was preheated for 10 minutes in an oven heated to 230° C., followed by rapidly taking out the plate, scattering a resin for powder molding (about 300 g) on the plate, allowing it to stand still for 5 seconds to effect baking, thereafter pulling up the plate at one end thereof by means of a wire, sweeping off non-melted, excess resin for powder molding, rapidly returning the plate into the oven, further heating it for 2 minutes, to completely melt the resin for powder molding on the iron plate and form a resin film on the iron plate and peeling off the resin film to make it a sample. The thicknesses of the respective samples thus obtained were subjected to six points measurement to obtain average values and deviation values. The evaluation was classified into the following four stages in terms of a ratio of deviation value to average value:

⊚: less than $8 \times 10^{-2}$ mm$^{-1}$
○: $8 \times 10^{-2}$ to $15 \times 10^{-2}$ mm$^{-1}$
△: more than 15 to $25 \times 10^{-2}$ mm$^{-1}$
×: more than $25 \times 10^{-2}$ mm$^{-1}$ (5) Mold-duplicating properties:

A mold of a flat plate (250 × 250 × 9 mm) wherein four grooves of 20 mm wide and 7 mm deep, 15 mm wide and 7 mm deep, 10 mm wide and 7 mm deep and 5 mm wide and 7 mm deep were cut on the surface of the plate; followed by applying a complicated, leather grain pattern onto the surface and further subjecting the resulting plate to plating treatment, had a resin for powder molding (about 700 g) baked thereon in the same manner as in the above evaluation 4), to have a resin film molded thereon. What a faithful extent the resin film could duplicate the design of the mold to was visually observed and the results were evaluated by classifying them into the following four stages:

⊚: good, ○: somewhat good, △somewhat inferior, and ×: inferior.

(6) Antistatic properties:

A resin for powder molding (20 g) was sealed in a polyethylene bag of 50 × 100 mm, followed by vigorously shaking it. As a result, a substance which is readily charged or a strongly sticky substance sticks in the form of particles onto the inner wall surface of the polyethylene bag. The state was visually observed and evaluated by classifying it into the following four stages: ⊚: good, ○: somewhat good, △: somewhat inferior, and ×: far inferior.

(7) Mechanical strength:

The resin film obtained in the above item (4) was measured according to the method of JIS-K-6723.

(8) Elongation:

The resin film obtained in the above item (4) was measured according to the method of JIS-K-6723.

(9) Percentage floating-up:

A resin for powder molding (800 g) is placed in a cylindrical vessel of 100 mm in the inner diameter and 270 mm high having a bottom of a porous plate, and the height of the resin at that time is referred to as "a". Thereafter, air at a rate of 0.82 m$^3$/min is sent through the porous plate of the bottom to form a fluidized state, and the height of the resin at that time is referred to as "b". The percentage floating-up was sought from the following ratio: (b − a) ×100/a.

(10) Fluidized state:

The fluidized state at the time when the percentage floating up was sought was visually evaluated.

⊚: very uniform fluidized state
○: uniform fluidized state
△: somewhat non-uniform fluidized state
×: non-uniform fluidized state

(11) Measurements of angle of repose and flowing-down velocity after one month:

A resin for powder molding (1 Kg) after its production was sealed in a polyethylene bag of 300 × 500 mm, followed by placing a resin bag (25 Kg) on the polyethylene bag and allowing them to stand for one month in a warehouse in which the temperature rose to 20° C. to 60° C. at the highest. The resulting angle of repose after they were allowed to stand was measured in the same manner as in the above item 1) and the flowing-down velocity similarly after one month was measured in the same manner as in the above item 2).

EXAMPLES 1-4

A vinyl chloride resin having an average polymerization degree of 800 (vinyl chloride homopolymer, a product of suspension polymerization) (100 parts by weight), a Ba-Zn stabilizer (5 parts by weight), an epoxidized soybean oil (5 parts by weight), a mixed phthalate of alkyls of 9, 10 and 11 carbon atoms (75 parts by weight) and a pigment-black (2 parts by weight) were fed into a 20 l capacity Henschel mixer (trademark) manufactured by Mitsuimiike Company, followed by mixing these on heating at 120° C. for 20 minutes, thereafter rapidly cooling the mixture to obtain a powdery vinyl chloride resin composition having a particle diameter around 120 to 180 μm (5 Kg). Thereafter, liquids for film listed in Table 1 (solutions of hydroxypropyl cellulose containing 53.3 to 77.5% of hydroxypropoxy group (made by Nippon Soda Company) dissolved in ethanol) (each 500 ml) were each sprayed onto the vinyl chloride composition (1 Kg) through an automatic spray gun (AT-2 type, tradename of a machine manufactured by Freund Sangyo Company) provided at the upper part of a Henschel mixer (tradename) maintained at 40° C. and 1,000 rpm. At that time, spraying was carried out at a rate of 25 ml/min based on 1 Kg of the vinyl chloride composition for 20 minutes, followed by carrying out agitation for 15 minutes under the same temperature condition to volatize off ethanol as a component of the liquid for film to thereby produce a resin for powder molding wherein the particle surface of the vinyl chloride composition was coated with a film of hydroxypropyl cellulose as a component of the liquid for film. The calculated value of the film quantity at that time is shown in Table 1.

The characteristics of the thus produced resins for film molding when subjected to powder molding, the characteristics of the resulting molded products and the characteristics of the products after allowed to stand for one month are together shown in Table 1. These molded products had no pinhole.

EXAMPLE 5-7

While the powdery vinyl chloride composition obtained in Example 1 was agitated in a Henschel mixer (tradename) kept at 50° C., a liquid for film shown in Table 2 (an aqueous dispersion of a self-crosslinking type acrylic resin (Plexytol B-500, trademark of product made by Rohm & Haas Company, West Germany)) was sprayed onto the vinyl chloride composition particles in a proportion of 500 ml per Kg of the composition particles, through a spray means having a spray nozzle, provided at the upper part of the Henschel mixer. Spraying was carried out at a rate of 25 ml/min per Kg of the vinyl chloride composition for 20 minutes. Thereafter, agitation was carried out under the same temperature condition for 15 minutes to completely volatize off water as a component of the liquid for film and thereby obtain resins for film having the vinyl chloride composition coated with the film component on the particle surface of the composition (see Table 1).

The characteristics of these resins for powder molding, subjected to powder molding, the characteristics of the resulting molded Products and the characteristics of the products after allowed to stand for one month are together shown in Table 1.

COMPARATIVE EXAMPLES 1 AND 2

Comparative example 1 refers to a product obtained by not coating the powdery vinyl chloride composition obtained under the conditions of Example 1.

Comparative example 2 refers to a resin for powder molding, obtained by adding 7.0 parts by weight of a vinyl chloride emulsion polymer of a fine powder having a particle diameter of 2 μm and a molecular weight of 1,100 to 100 parts by weight of a powdery vinyl chloride composition obtained under the conditions of Example 1, followed by agitating the mixture for 5 minutes in a Henschel mixer (tradename) kept at room temperature to coat the composition with the fine powder.

The characteristics of these resins for powder molding, subjected to powder molding, the characteristics of the resulting mold products and the characteristics of the products after allowed to stand for one month are together shown in Table 1. Further, the molded product of Comparative example 1 had 3 pinholes.

EXAMPLE 8

While the powdery vinyl chloride composition obtained in Example 1 was agitated in a Henschel mixer (trademark) kept at 50° C., a solution of hydroxypropyl cellulose in ethanol indicated in Table 2 was sprayed onto the surface of the particles of the powdery composition obtained in Example 1 in a proportion of 500 ml per Kg of the powdery composition through a spraying means having a spray nozzle, provided at the upper part of the Henschel mixer. The spraying was carried out for 20 minutes at a rate of 25 ml/min per Kg of the powdery composition, followed by carrying out agitation under the same temperature condition for 15 minutes and vaporizing off water as a component of the liquid for film to obtain a resin for powder forming, having a double layer of hydroxypropyl cellulose and an acrylic resin formed on the particle surface of the powdery vinyl chloride composition.

EXAMPLE 9

While the powdery composition obtained in Example 5 was agitated in a Henschel mixer (trademark) maintained at 40° C., a solution of hydroxypropyl cellulose dissolved in ethanol, indicated in Table 2, was sprayed onto the particle surface of the powdery composition obtained in Example 5 in a proportion of 500 ml per Kg of the powder composition obtained in Example 5, through a spray means having a spray nozzle, provided at the upper part of the Henschel mixer. Spraying was carried out for 20 minutes at a spraying velocity of 25 ml/min per Kg of the powdery composition obtained in Example 5, followed by carrying out agitation under the same temperature condition for 15 minutes and volatizing off ethanol as a component of the solution of hydroxypropyl cellulose dissolved in ethanol to obtain a resin for powder molding, having a double layer film of an acrylic resin and hydroxypropyl cellulose formed on the particle surface of the powdery vinyl chloride composition. The proportions of the powdery compositions obtained in Examples 8 and 9 are shown in Table 2. Further, the characteristics of the resins for powder molding, subjected to powder molding and the characteristics of the resulting molded products are together shown in Table 2.

EXAMPLE 10

While a powdery vinyl chloride composition obtained under the conditions of Example 1 was agitated in a Henschel mixer kept at 30° to 40° C., a liquid for film (a solution of an acrylic resin BR-85 for coating (tradename) made by Mitsubishi Rayon Company, dissolved in ethyl acetate indicated in Table 3, was sprayed in a proportion of 500 ml per Kg of the vinyl chloride composition through a spray means having a spray nozzle provided at the upper part of the Henschel mixer. Spraying was carried out for 20 minutes at a spray velocity of 25 ml/min per Kg of the vinyl chloride composition, followed by drying the resulting material at the same temperature condition for 15 minutes to vaporize off ethyl acetate as a component of the liquid for film to thereby obtain a resin for powder molding having the particle surface of the vinyl chloride resin coated with the acrylic resin for coating as a component of the liquid for film. The calculated value of the film quantity at that time is shown in Table 3.

The characteristics of the resin for powder molding subjected to powder molding, the characteristics of the resulting molded product and the characteristics of the product after allowed to stand for one month are together shown in Table 3.

EXAMPLE 11

While a powdery vinyl chloride composition obtained under the conditions of Example 1 was agitated by Spiral Flow (trademark of a coating means manufactured by Freund Sangyo Company) kept at 30° to 40° C. and also floated by air blown up from the lower part of the vessel, a liquid for film (a solution of a coating acrylic resin BR-85 (tradename of product made by Mitsubishi Rayon Company) dissolved in ethyl acetate), indicated in Table 3, was sprayed in a proportion of 200 ml per Kg of the vinyl chloride composition through a spray means having a spray nozzle, provided inside the Spiral Flow. Spraying was carried out at a rate of 6.7 ml/min per Kg of the vinyl chloride resin for 30 minutes, followed by drying the resulting material under the same temperature condition for 5 minutes to volatize off ethyl acetate as a component of the liquid for film to thereby produce a resin for powder molding having the particle surface of the vinyl chloride composition with the coating acrylic resin as a component of the liquid for film. The calculated value of the film quantity at that time is shown in Table 3.

The characteristics of the resin for powder molding subjected to powder molding, the characteristic of the resulting molded product and the characteristic of the product after allowed to stand for one month are together shown in Table 3.

EXAMPLE 12

While a powdery vinyl chloride composition obtained under the conditions as in Example 1 was agitated in a coating means Spiral Flow (trademark of a device manufactured by Froint Sangyo Company) maintained at 30° to 40° C. and floated by air blown up from the lower part of the apparatus, a liquid for film (a solution of a vinyl chloridevinyl acetate copolymer adhesive DB-101 (tradename of product made by Diabond Kogyo Company) dissolved in ethyl acetate), indicated in Table 3 was sprayed in a proportion of 100 ml per Kg of the vinyl chloride composition. Spraying was carried out at a rate of 6.7 ml/min per Kg of the vinyl chloride composition for 15 minutes, followed by drying the resulting material under the same temperature condition for 5 minutes to vaporize off ethyl acetate as a component of the liquid for film and thereby produce a resin for powder molding having the particle surface of the vinyl chloride composition coated with the vinyl chloride-vinyl acetate copolymer adhesive as a component of the liquid for film. The calculated value of the film quantity at that time is shown in Table 3.

The characteristics of the resin for powder molding subjected to power molding, the characteristics of the resulting molded product and the characteristics of the product after allowed to stand for one month are together shown in Table 3.

EXAMPLE 13

While the powdery vinyl chloride composition obtained under the conditions as in Example 1 was agitated in a Henschel mixer kept at 50° C., a vinyl chloride emulsion polymer containing fine powder having a particle diameter of 2 μm and a molecular weight of 1,100 (30 g) was added to the vinyl chloride composition (1 Kg), followed by spraying a liquid for film (an aqueous dispersion of a self-crosslinking acrylic resin (Plexytol B-500, trademark of product made by Rohm & Haas Company, West Germany)) indicated in Table 2 in a proportion of 500 ml per Kg of the vinyl chloride composition, onto the particles of the vinyl chloride composition, through a spray means having a spray nozzle provided at the upper part of the Henschel mixer. Spraying was carried out at a rate of 25 ml/min per Kg of the vinyl chloride composition for 20 minutes, followed by agitating the resulting material under the same temperature condition for 5 minutes, thereafter adding a vinyl chloride emulsion polymer containing fine powder having a particle diameter of 2 μm and a molecular weight of 1,100 in a proportion of 40 g per Kg of the vinyl chloride composition, agitating the mixture under the same temperature condition for 10 minutes and completely vaporizing off water as a component of the liquid film to obtain a resin for powder molding having the particle surface of the vinyl chloride composition coated with the film component, shown in Table 4.

The characteristics of the resin for powder molding subjected to powder molding, the characteristics of the resulting molded product and the characteristics of the product after allowed to stand for one month are together shown in Table 4.

TABLE 1

| Sample | Concentration of liquid for film | Film quantity of resin for film (wt. part) | Evaluation item | | | | |
| --- | --- | --- | --- | --- | --- | --- | --- |
| | | | Angle of repose (°) | Dropping speed (sec/100 ml) | Bulk density (g/ml) | Uniformity of coating of molded product | Duplicability of mold |
| Ex. 1 | H 10 g/L | 0.5 | 34 | 15 | 0.596 | ○ | ○ |
| Ex. 2 | H 20 g/L | 1.0 | 34 | 15 | 0.592 | ○ | ○ |
| Ex. 3 | H 60 g/L | 3.0 | 34 | 15 | 0.591 | ⊚ | ⊚ |

TABLE 1-continued

| Sample | | | | | | | |
|---|---|---|---|---|---|---|---|
| Ex. 4 | H 200 g/L | 10.0 | 34 | 16 | 0.590 | Δ | ○ |
| Ex. 5 | A 1% | 0.5 | 34 | 15 | 0.573 | ○ | ○ |
| Ex. 6 | A 2% | 1.0 | 34 | 15 | 0.570 | Δ | ○ |
| Ex. 7 | A 4% | 2.0 | 35 | 16 | 0.566 | Δ | ○ |
| Comp. ex. 1 | | 0 | 43 | 32 | 0.468 | x | x |
| Comp. ex. 2 | (7.0) Emulsion polymer | | 37 | 18 | 0.587 | Δ | Δ |

| | Evaluation item | | | | | Evaluation item after allowed to stand for one month | |
|---|---|---|---|---|---|---|---|
| Sample | Antistatic properties | Mechanical strength (Kg/mm²) | Elongation (%) | Percentage floating-up (%) | Fluidized state | Angle of repose (°) | Dropping speed (sec/100 ml) |
| Ex. 1 | ⊙ | 1.0 | 277 | 16.7 | ⊙ | 34 | 15 |
| Ex. 2 | ⊙ | 0.9 | 282 | 17.4 | ⊙ | 34 | 15 |
| Ex. 3 | ⊙ | 1.0 | 280 | 17.2 | ⊙ | 33 | 15 |
| Ex. 4 | ⊙ | 0.9 | 285 | 16.3 | ⊙ | 34 | 16 |
| Ex. 5 | Δ | 1.0 | 277 | 15.3 | ⊙ | 34 | 15 |
| Ex. 6 | Δ | 1.0 | 273 | 17.0 | ⊙ | 35 | 15 |
| Ex. 7 | Δ | 1.0 | 283 | 16.1 | ⊙ | 35 | 15 |
| Comp. ex. 1 | Δ | 0.9 | 278 | 4.5 | x | 44 | 41 |
| Comp. ex. 2 | Δ | 1.0 | 289 | 11.9 | ○ | 38 | 19 |

Note)
Concentration of liquid for film "H" refers to quantity of hydroxypropyl cellulose dissolved in 1 l of ethanol (g/l).
Concentration of liquid for film "A" refers to quantity of self-crosslinking acrylic resin in aqueous solution (%).
Film quantity refers to quantity after dried, based on 100 wt. parts of vinyl chloride resin.

TABLE 2

| | Quantity of one film of resin for powder molding (wt. part) | Quantity of two films of resin for film (wt. part) | Evaluation item | | | | |
|---|---|---|---|---|---|---|---|
| Sample | | | Angle of repose (°) | Dropping speed (sec/100 ml) | Bulk density (g/ml) | Uniformity of coating of molded product | Duplicability of mold |
| Ex. 8 | H 1.0 | A 0.5 | 34 | 14 | 0.582 | ○ | ⊙ |
| Ex. 9 | A 0.5 | H 0.5 | 33 | 13 | 0.596 | ⊙ | ⊙ |

| | Evaluation item | | | | | Evaluation item after allowed to stand for one month | |
|---|---|---|---|---|---|---|---|
| Sample | Antistatic properties | Mechanical strength (Kg/mm²) | Elongation (%) | Percentage floating-up (%) | Fluidized state | Angle of repose (°) | Dropping speed (sec/100 ml) |
| Ex. 8 | ○ | 0.9 | 293 | 20.0 | ⊙ | 34 | 13 |
| Ex. 9 | ⊙ | 1.0 | 281 | 21.1 | ⊙ | 33 | 13 |

Note)
Quantity of one film: "H" at first time refers to solution of hydroxypropyl cellulose (10 g) in ethanol (1 l); "A" refers to quantity after dried, 1% aqueous solution of self-crosslinking acrylic resin per 100 wt. parts of vinyl chloride composition. Quanity of two films: quantity of second time film after drying of first time film. "H" and "A" refer to solution of hydroxypropyl cellulose and that of self-crosslinking acrylic resin, respectively, the respective concentrations being same.

TABLE 3

| | | | Evaluation item | | | | |
|---|---|---|---|---|---|---|---|
| Sample | Concentration of liquid for film | Film quantity of resin for film (wt. part) | Angle of repose (°) | Dropping speed (sec/100 ml) | Bulk density (g/ml) | Uniformity of coating of molded product | Duplicability of mold |
| Ex. 10 | M 40 g/L | 2.0 | 34 | 13 | 0.594 | ○ | ⊙ |
| Ex. 11 | M 100 g/L | 2.0 | 33 | 12 | 0.600 | ⊙ | ⊙ |
| Ex. 12 | N 200 g/L | 2.0 | 34 | 14 | 0.606 | ○ | ○ |

| | Evaluation item | | | | | Evaluation item after allowed to stand for one month | |
|---|---|---|---|---|---|---|---|
| Sample | Antistatic properties | Mechanical strength (Kg/mm²) | Elongation (%) | Percentage floating-up (%) | Fluidized state | Angle of repose (°) | Dropping speed (sec/100 ml) |
| Ex. 10 | ⊙ | 1.0 | 282 | 19.3 | ⊙ | 34 | 14 |
| Ex. 11 | ⊙ | 1.0 | 268 | 20.8 | ⊙ | 33 | 12 |
| Ex. 12 | ⊙ | 0.9 | 281 | 19.6 | ⊙ | 34 | 14 |

Note)
Concentration of liquid for film: "M" refers to quantity of coating acrylic resin dissolved in 1 l of ethyl acetate (g/l).
Concentration of liquid for film: "N" refers to quantity of vinyl chloride-vinyl acetate copolymer adhesive dissolved in 1 l of ethyl acetate (g/l).
Film quantity: Quantity after drying, based on 100 wt. parts of vinyl chloride composition.

TABLE 4

| Sample | Concentration of liquid for film | Film quantity of resin for film (wt. part) | Sticked quantity of resin for film (wt. part) | Evaluation item | | | | |
|---|---|---|---|---|---|---|---|---|
| | | | | Angle of repose (°) | Dropping speed (sec/100 ml) | Bulk density (g/ml) | Uniformity of coating of molded product | Duplicability of mold |
| Ex. 13 | A 2% | 1.0 | 7.0 Emulsion polymer | 3 | 13 | 0.604 | ⊙ | ⊙ |

| Sample | Evaluation item | | | | | Evaluation item after allowed to stand for one month | |
|---|---|---|---|---|---|---|---|
| | Antistatic properties | Mechanical strength (Kg/mm²) | Elongation (%) | Percentage floating-up (%) | Fluidized state | Angle of repose (°) | Dropping speed (sec/100 ml) |
| Ex. 13 | ⊙ | 1.01 | 277 | 21.6 | ⊙ | 33 | 13 |

Note)
Concentration of liquid for film: "A" refers to quantity of self-crosslinking acrylic resin dissolved in aqueous solution (%).
Film quantity: Quantity after drying, based on 100 wt. parts of vinyl chloride composition.

What we claim is:

1. A resin for powder molding, having a powdery vinyl chloride resin composition containing a plasticizer absorbed inside the resin particles, coated with a solventsoluble high molecular weight polymer film component on the surface of said powder vinyl chloride resin composition, said polymer film component comprises at least one member selected from the group consisting of a cellulosic compound, a vinyl chloride-vinyl acetate copolymer and an acrylic resin, said polymer film component being coated on the powder vinyl chloride resin composition by spraying a film-forming liquid consisting of a polymer film component and a carrier medium onto the surface of said powder resin composition, followed by removing the carrier medium to form a film of the film-forming polymer on the powder vinyl chloride resin composition.

2. A resin for powder molding, having a powdery vinyl chloride resin composition containing a plasticizer absorbed inside the resin particles, coated with 0.1 to 30 parts by weight of a solvent soluble high polymer film component on the surface of said powdery composition, said polymer film component is at least one layer and is selected from at least one member of the group consisting of cellulosic compounds, vinyl chloride-vinyl acetate copolymers, and acrylic resins, said polymer film component being coated on the powder vinyl chloride resin composition by spraying a film-forming liquid consisting of a polymer film component and a carrier medium onto the surface of said powder resin composition, followed by removing the carrier medium to form a film of the film-forming polymer on the powder vinyl chloride resin composition.

3. A resin for powder molding according to claim 2 wherein said polymer film component is at least two layers which may be the same or different and each is composed of at least one member selected from the group consisting of cellulosic compounds, vinyl chloride-acetate copolymers and acrylic resins.

4. A resin for powder molding according to claim 3 wherein 100 parts by weight of said powdery vinyl chloride resin composition are coated with 0.1 to 30 parts by weight of said polymer film component.

5. A resin for powder molding according to claim 3 wherein said powdery vinyl chloride resin composition is coated with said polymer film component and fine powder on the surface of said powdery composition.

6. A resin for powder molding according to claim 5, wherein said fine powder is of a vinyl chloride resin having an average particle diameter of 0.001 to 20 μm.

7. A resin for powder molding according to claim 2 wherein said polymer film component is at least two layers and each said layer may be the same or different and each is selected form the group consisting of cellulosic compounds, vinylchloride, vinylacetate, copolymers and acrylic resin.

* * * * *